Figure 1:
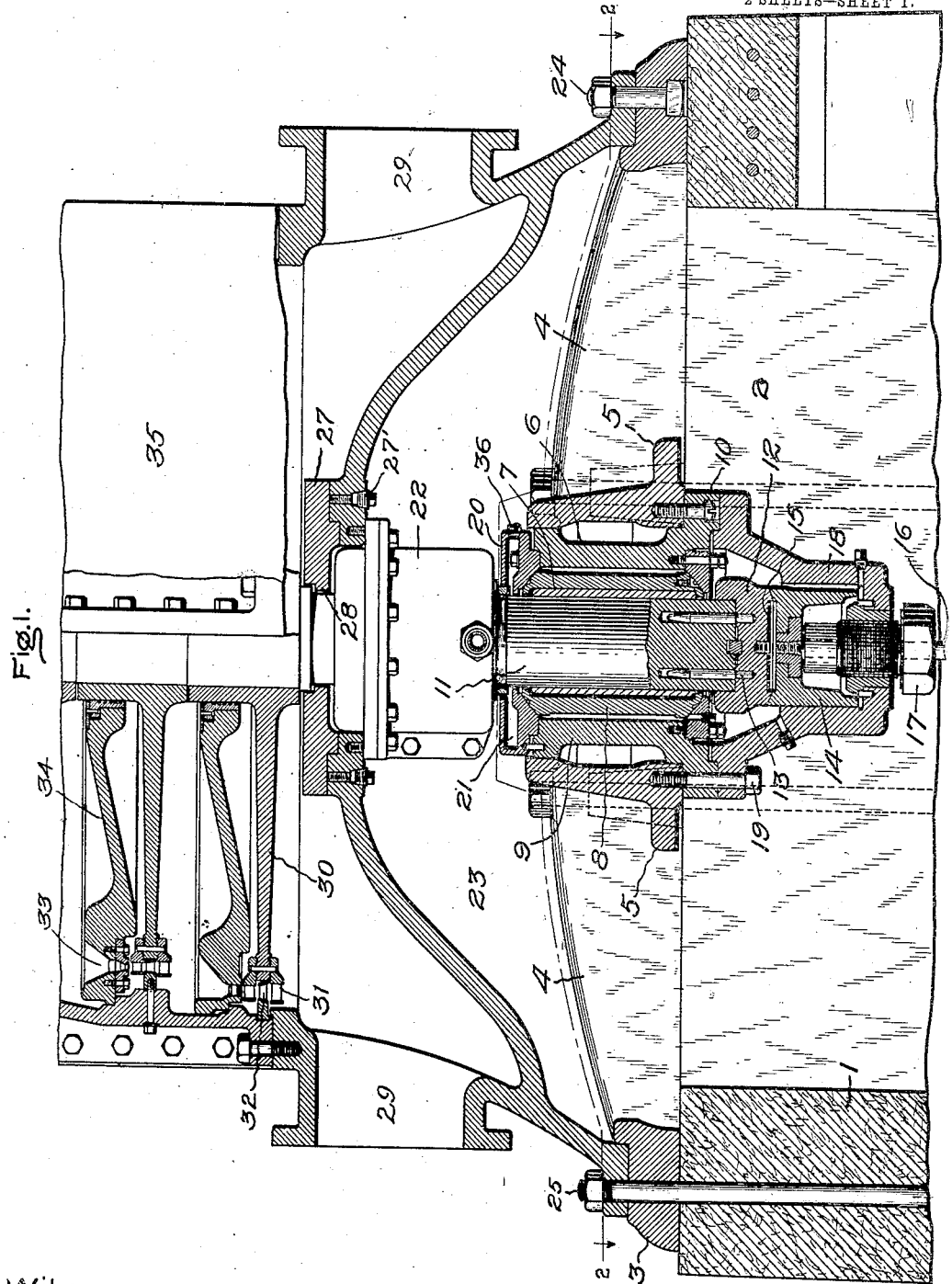

No. 863,777. PATENTED AUG. 20, 1907.
F. R. C. BOYD.
ELASTIC FLUID TURBINE.
APPLICATION FILED JAN. 29, 1907.

2 SHEETS—SHEET 1.

Witnesses:
Marcus L Byng.
J. Ellis Klein

Inventor,
Frederic R. C. Boyd,
By Albert G. Davis
Att'y.

No. 863,777.
PATENTED AUG. 20, 1907.
F. R. C. BOYD.
ELASTIC FLUID TURBINE.
APPLICATION FILED JAN. 29, 1907.
2 SHEETS—SHEET 2.
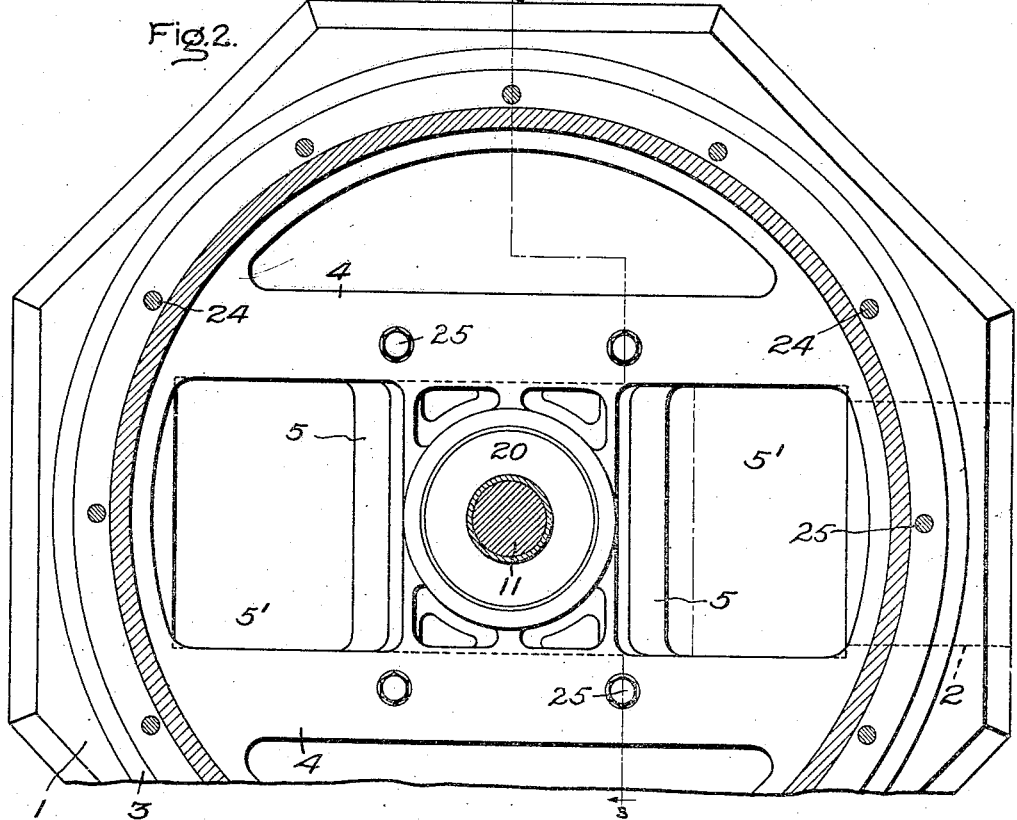
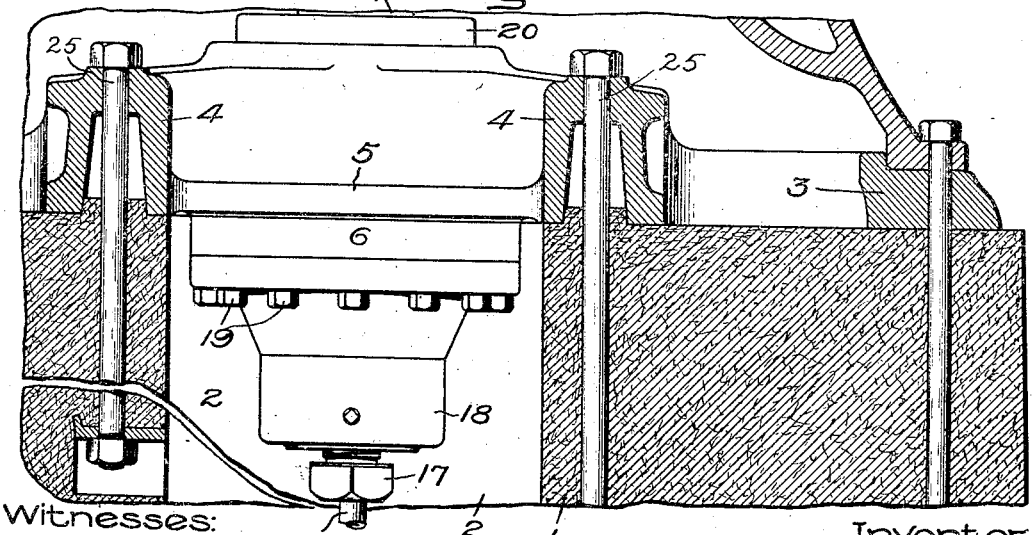
Witnesses:
Marcus L. Byng.
J. Ellis Glen.
Inventor,
Frederic R. C. Boyd,
By Albert G. Davis
Att'y

UNITED STATES PATENT OFFICE.

FREDERIC R. C. BOYD, OF LYNN, MASSACHUSETTS, ASSIGNOR TO GENERAL ELECTRIC COMPANY, A CORPORATION OF NEW YORK.

ELASTIC-FLUID TURBINE.

No. 863,777.

Specification of Letters Patent.

Patented Aug. 20, 1907.

Application filed January 29, 1907. Serial No. 354,687.

*To all whom it may concern:*

Be it known that I, FREDERIC R. C. BOYD, a citizen of the United States, residing at Lynn, county of Essex, State of Massachusetts, have invented certain new and useful Improvements in Elastic-Fluid Turbines, of which the following is a specification.

It is customary in vertical shaft elastic fluid turbines to provide a base for the machine that is supported by a suitable masonry column, the said base being anchored at the periphery by foundation bolts. This base is provided with a chamber to receive the steam exhausting from the bucket wheels located above it and contained in a cylindrical casing resting on and supported by the base. The bottom wall of the base which usually has considerable area is provided with an opening to receive the casing of the step and lower guide-bearing for the shaft, the said casing being rigidly bolted to the bottom wall.

I have found from practical experience some cases where the bottom wall of the base changes so in position under changes in pressure, temperature and vacuum, that the relation of the relatively movable parts is seriously affected. Under some conditions the bottom wall will rise and in other cases fall. In certain cases I have found that the said wall will twist or distort to such an extent under the changes in conditions mentioned as to throw the step-bearing seriously out of line and cause vibration and sometimes injury to the shaft and its guide bearings. These objections are probably due wholly or in large part to poor castings and also to the fact that the area of the bottom wall of the base is comparatively large. Also to the fact that the bottom wall is subjected on one side to a practically uniform temperature, i. e., that of the engine room, and on the other side to a variable temperature due to the action of the condenser and occasioned by load changes.

From the appearance of the castings it is impossible to tell whether or not the metal therein is subjected to unequal internal stresses and will subsequently give trouble in service. The particular type of turbine has nothing to do with these distortions since they are due solely to temperature changes which, of necessity, must take place under conditions of variable load.

My invention, therefore, has for its object to eliminate the effects of temperature changes on the step-and-guide bearings support and to provide an improved construction where the positions of said bearings will remain fixed for all time without respect to load changes.

In the accompanying drawings, which illustrate one of the embodiments of my invention, Figure 1 is an axial section of the lower portion of a vertical shaft turbine and its support; Fig. 2 is a cross-section taken on line 2, 2, of Fig. 1; and Fig. 3 is an enlarged sectional view taken on line 3, 3, of Fig. 2.

1 represents the masonry column or pier upon which the turbine is supported. It is of suitable shape and is provided with an opening 2 extending from one side to a point somewhat beyond the center to enable a workman to enter and inspect the parts or to assemble or take down the step and guide bearings and parts thereof. Mounted directly on top of the column and well grouted to insure its remaining in the proper position is a sub-base 3 which comprises a heavy annular portion and suitable connecting ribs. Where the annular portion contains a large amount of metal I may divide it at one or more points, preferably two, to prevent it from splitting due to unequal strains in cooling.

In the present embodiment of the invention two long ribs 4 and two short ribs 5 are provided, the former extending across the base and the latter connecting the long ribs at intermediate points. The long ribs are supported throughout their length by the foundation. The arrangement of the ribs can be varied to suit the requirements, the essential thing being to make a good solid support for the step and guide bearings. Between the short ribs and the annular portions are openings 5′ to enable a workman to get at the shaft packing and upper end of the guide bearing. The ribs are united in a manner to form a hub, the said hub being provided with a central cylindrical orifice to receive the casing 6 of the combined step-and-guide bearing.

The guide bearing 7 is made of Babbitt or other suitable material and is mounted in a sleeve 8, the ends of which form portions of a sphere to assist in preserving the alinement of the parts. This sleeve is contained in the cylindrical portion 9 of the bearing casing, the latter being secured to the hub of the sub-base by bolts 10. On the lower end of the vertical shaft 11 is a bearing block 12 prevented by a key from rotating independently thereof. Axially extending pins 13 are employed to assist in guiding the parts into place in assembling. 14 represents the lower bearing block and between the blocks is formed a chamber 15 receiving lubricant under pressure from a pipe 16 extending upward through the adjusting screw 17. The lower block is guided by the cylindrical wall of the head 18, the latter being secured to the hub of the sub-base by bolts 19. These bolts also extend through a flange on the cylindrical portion of the casing, the short bolts 10 alternating with the long bolts 19. The opposed surfaces of the bearing blocks form portions of a sphere whose center is the same as that of the ends of the sleeve 8 to assist in the alinement of the parts. The upper end of the sleeve of the guide bearing is held in place by a cap 20 having a spherical bearing surface and bolted to the portion 9 of the casing. Lubricant, supplied to the step through the pipe 16, passes through the chamber in the blocks and exhausts into the chamber 21 from which it flows through suitable channels in the guide bearing to the exhaust oil pipe 36. Surrounding the shaft at a point above the guide bearing is a shell 22 made in sections and containing a packing to prevent air from leaking into the exhaust receiving chamber 23 in the base of the machine.

The base of the turbine is seated on a shoulder formed on the upper side of the sub-base and is secured thereto by short bolts 24 and also by long foundation bolts 25. By removing the nuts on the foundation bolts the turbine, including the sub-base, can readily be lifted by a crane and moved about as desired. In case of injury to the turbine, it can be removed from its place without disturbing the foundation, sub-base and grouting by removing the nuts on the bolts 24 and a new turbine substituted. This feature has great advantages, and in many cases will result in a large saving in time and expense. The bottom wall of the base is made in the form of an arch or dome to give strength and also to provide room for the packing and its shell 22 and to give access thereto and also to the top of the guide bearing. It will thus be seen that the parts are very accessible, an important feature in a machine of this character. The bottom wall is united to the cylindrical portion of the base a short distance above the finished surface thereof so as to minimize the effects of distortion thereon. The top of the dome is provided with a plate 27 which makes a fairly good fit with the shaft and which, when lifted by the jack-screws 27', affords, through the shoulder 28, a support for the shaft when the step bearing is removed. One or more suitable conduits 29 are provided to convey the exhaust steam to a condenser or other exhaust.

Mounted on the shaft are wheels 30 having rows of buckets 31 between which are rows of intermediate buckets 32. Steam or other elastic fluid is discharged to the buckets by nozzle passages 33 formed in the diaphragms 34, the latter dividing the wheel casing 35 into stage compartments. The upper end of the casing is provided with the usual head, valve chest, governing mechanism, etc., not shown. The upper end of the shaft is supported in a suitable guide bearing, preferably one having the same characteristics as that described.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. In a turbine, the combination of a wheel casing having an inlet and an exhaust, a vertical shaft, wheel buckets mounted on the shaft, devices discharging motive fluid against the buckets, a bearing for supporting the weight of the shaft and moving parts, and a support for the bearing which is independent of the wheel casing so as not to be affected by temperature or other changes to which it is subjected.

2. In a turbine, the combination of a wheel casing having an inlet and an exhaust, a vertical shaft, wheel buckets mounted on the shaft, devices discharging motive fluid against the buckets, step-and-guide bearings, and a support common to the bearings which is independent of the wheel casing and is incapable of varying its position due to temperature or other changes within said casing.

3. A turbine comprising a wheel casing, a vertical shaft carrying the wheel buckets, and fluid discharging devices in combination with a sub-base that is adapted to be mounted on a foundation and support the wheel casing, and a combined step-and-guide bearing which is supported solely by the sub-base.

4. In a turbine, the combination of a sub-base adapted to be mounted on a foundation, a wheel casing mounted on the sub-base, a vertical shaft, wheel buckets mounted thereon, and a step bearing which is carried by the sub-base and is independent of the turbine casing.

5. In a turbine, the combination of a sub-base adapted to be mounted on a foundation, a wheel casing mounted on the sub-base, a vertical shaft, wheel buckets mounted thereon, and a combined step-and-guide bearing which is supported solely by the sub-base.

6. A turbine comprising a wheel casing part of which is subjected to distortion due to temperature changes, a vertical shaft, buckets carried thereby, and fluid discharging devices, in combination with a sub-base having an annular portion with a peripheral shoulder adapted to receive and support the base of the wheel casing, ribs extending across the sub-base, and a bearing for supporting the weight of the shaft and moving parts carried by said ribs.

7. In combination, a wheel casing having a dome-shaped bottom wall, a sub-base upon which the casing rests, a combined step-and-guide bearing carried by the sub-base and separated from the said wall by a space, a shaft packing in said space, a vertical shaft mounted in the bearing, buckets carried by the shaft, and fluid discharging devices.

8. In combination, fluid discharging devices, a casing comprising a portion inclosing the wheels, and a base portion containing a chamber and having a bottom wall therefor located a short distance above the bottom of the base, a sub-base adapted to be mounted on a foundation, and comprising a peripheral portion on which the base rests and ribs extending perpendicular to the shaft and forming a hub-like central portion, a vertical shaft carrying the wheels, a step bearing mounted in the hub, and a head removably secured to the under side of the hub for supporting the bearing.

9. A turbine comprising a casing, fluid discharging devices, buckets for abstracting the energy of the motive fluid, and a vertical shaft, in combination with a sub-base, a combined step-and-guide bearing, a head supporting the step bearing from the under side of the sub-base, and a cap for the guide bearing which is secured to the upper side of the sub-base.

10. In combination, a turbine of the vertical shaft type, a sub-base for supporting the moving element of the turbine and also its casing, the said base adapted to be mounted on a foundation, a set of bolts for uniting the turbine and sub-base, and a second set of bolts for anchoring both the sub-base and the casing to the foundation.

In witness whereof, I have hereunto set my hand this twenty-fifth day of January, 1907.

FREDERIC R. C. BOYD.

Witnesses:
JOHN A. MCMANUS, Jr.,
HENRY O. WESTENDARP.